United States Patent
Haug et al.

(10) Patent No.: US 6,322,608 B1
(45) Date of Patent: *Nov. 27, 2001

(54) METHOD FOR PRODUCING A COMPONENT FROM A COMPOSITE AL₂O₃/TITANIUM ALUMINIDE MATERIAL

(75) Inventors: Tilmann Haug, Uhldingen-Mühlhof; Christoph Hesselmann, Rheine; Steffen Rauscher, Ulm; Michael Scheydecker, Nersingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/554,515
(22) PCT Filed: Nov. 3, 1998
(86) PCT No.: PCT/EP98/06955
 § 371 Date: May 17, 2000
 § 102(e) Date: May 17, 2000
(87) PCT Pub. No.: WO99/28274
 PCT Pub. Date: Jun. 10, 1999

(30) Foreign Application Priority Data

Nov. 28, 1997 (DE) ............................................. 197 52 776

(51) Int. Cl.⁷ ....................................................... B22F 3/12
(52) U.S. Cl. .......................... 75/235; 264/681; 264/643; 264/656; 419/45
(58) Field of Search .................................. 264/643, 641, 264/654, 656, 681; 419/45; 75/313, 235

(56) References Cited

U.S. PATENT DOCUMENTS

| | | | |
|---|---|---|---|
| 4,988,645 | 1/1991 | Holt et al. | 501/91 |
| 5,214,011 * | 5/1993 | Breslin . | |
| 6,022,505 * | 2/2000 | Rauscher et al. . | |
| 6,051,277 * | 4/2000 | Claussen et al. . | |

FOREIGN PATENT DOCUMENTS

| | | |
|---|---|---|
| 196 05 858 | 8/1997 | (DE) . |
| 197 10 671 | 9/1998 | (DE) . |
| 0 790 223-A1 * | 8/1997 | (EP) . |
| 0 790 223 A1 | 8/1997 | (EP) . |
| 0 864 551-A3 * | 9/1998 | (EP) . |
| WO 84/02927 | 8/1984 | (WO) . |

* cited by examiner

Primary Examiner—Roy King
Assistant Examiner—Harry D. Wilkins, III
(74) Attorney, Agent, or Firm—Crowell & Moring LLP

(57) ABSTRACT

The invention relates to a process for producing a component from an Al₂O₃/titanium aluminide composite material. To produce the component, a shaped body is pressed from a starting mix of titanium, in particular as an oxide, carbon and/or its precursors, fillers and binders. At a conversion temperature, the shaped body is subjected to a heat treatment in order to form a pressure-stable sacrificial body. In the process, the filler and, if appropriate, the binder is/are also removed by thermal means. The sacrificial body is filled with aluminum and/or an aluminum alloy under pressure. The filling takes place at a filling temperature which is above the conversion temperature. Then, the temperature is reduced to a transformation temperature, the materials of the filled sacrificial body and the aluminum reacting through a solid-state reaction, below the filling temperature, to form an Al₂O₃/titanium aluminide composite body.

38 Claims, No Drawings

METHOD FOR PRODUCING A COMPONENT FROM A COMPOSITE $Al_2O_3$/TITANIUM ALUMINIDE MATERIAL

BACKGROUND OF THE INVENTION

This invention relates to a process for producing a component from an $Al_2O_3$/titanium aluminide composite material in which a shaped body is pressed from a starting mix containing titanium, in particular as an oxide, the shaped body is subjected to a heat treatment at a conversion temperature to produce a sacrificial body, the sacrificial body is filled with softened or liquid aluminum and/or an aluminum alloy under pressure at a filling temperature, and starting materials of the sacrificial body are reacted with the filled aluminum to form an $Al_2O_3$/titanium aluminide composite material as is known from DE 196 05 858 A1.

DE 196 05 858 A1 has disclosed a process for producing a component from an $Al_2O_3$/titanium aluminide composite material. The ceramic/metal composite material combines the properties of the ceramic and the metallic phases and has a high strength and a high fracture toughness. In the process on which the invention is based, a starting mix is formed containing, inter alia, titanium in the form of an oxide compound. The titanium oxide can be reduced by means of aluminum so as to simultaneously form aluminide and $Al_2O_3$. One titanium oxide of the starting mix which may be mentioned is $TiO_2$. A shaped body which is close to its final shape is pressed from the starting mix. The shaped body is converted, by means of a heat treatment at a conversion temperature, into a sacrificial body, which is then infiltrated with liquid aluminum. Before being filled with aluminum, the sacrificial body is sintered under pressure. After sintering, the temperature of the sacrificial body is set to a filling temperature which is above the melting temperature of aluminum and/or an aluminum alloy (referred to below, including the claims, as aluminum for simplification purposes). Furthermore, the filling temperature is below a reaction temperature at which a so-called SHS reaction takes place between the aluminum and at least one of the starting materials. An SHS reaction (self-propagating high-temperature synthesis) is a reaction which above its reaction temperature takes place very quickly, is highly exothermic and is at least almost uncontrollable. At the filling temperature, the sacrificial body is filled with aluminum under pressure. After filling, the filled sacrificial body is heated beyond the filling temperature to a transformation temperature which is above the filling temperature, at which an exchange reaction takes place between the aluminum and the constituents of the sacrificial body, so as to form an $Al_2O_3$/titanium aluminide composite material.

However, the sacrificial body, as is evident from the examples given in DE 196 05 858 A1, is only transformed into the $Al_2O_3$/titanium aluminide composite material in certain areas. Furthermore, it can also be seen from DE 196 05 858 A1 that a sacrificial body containing $TiO_2$ can only be completely filled with aluminum in some instances. Furthermore, a sacrificial body of this nature can also only be completely provided with a titanium aluminide phase in exceptional cases, resulting in a high reject rate.

DE-P 19710671.4, which is not a prior publication, discloses a process for producing a component from a metal/ceramic composite material, in which a sacrificial body comprising ceramic precursor materials is filled with thermally softened metal—in particular aluminum—and/or with a metal alloy. The filling temperature is below a reaction temperature, at which reaction temperature an exchange reaction between a metal of the ceramic precursor material and a metal of the filling metal takes place. After the sacrificial body has been filled as completely as possible, the filled sacrificial body is heated to the transformation temperature or above, as a result of which the exchange reaction just mentioned then takes place. This exchange reaction produces a component made from the metal/ceramic composite material which comprises a ceramic phase and a metallic phase with an intermetallic bond between the metal of the ceramic and the metal of the filling metal. As a result of the sacrificial body being filled with a metal which has been softened by heating at below a reaction temperature at which an exchange reaction takes place between the filling metal and the material of the sacrificial body, the ceramic matrix is retained during filling and also during the subsequent exchange reaction between the introduced metal and the material of the sacrificial body. Ideally, the pores of the sacrificial body are completely filled, so that when the substances in question are used in stoichiometric amounts, the component has reacted fully all through and is free of cracks and channels. Preferably, the filling metal is aluminum and the metal of the ceramic is titanium, so that after the preferred exchange reaction the ceramic phase comprises $TiB_x$ and/or $TiC_y$ and/or $TiCN$ and $Al_2O_3$, and the intermetallic compound of the metallic phase is a high-temperature-resistant titanium aluminide, in particular TiAl. The material properties of this metal/ceramic composite material are good. Thus, for example, a metal/ceramic composite material which is produced using aluminum as filling metal and Ti as metal of the ceramic sacrificial body has a density of 3.4 g/cm$^3$; this density is slightly higher than that of the MMCs (metal matrix composites) but is only 42% of the density of comparable cast iron. Particularly in the preferred embodiment, in which the high-temperature-resistant compound is in the form of the intermetallic compound TiAl, the use range of the component extends to at least 800° C., significantly above the values for grey cast iron. The metal/ceramic composite material produced is used, in particular, to manufacture friction rings for the frictional surfaces of disc brakes. These friction rings are subsequently fixed by means of mechanical joining techniques, such as screws, etc., to the hub of the brake disc.

However, before the sacrificial body is filled with the metal or the alloy, the starting materials of the sacrificial body have to be heated, a first exchange reaction taking place between the precursor materials, in which reaction high-grade, expensive precursor materials form from the exchange materials. After filling with the metal, the ceramic phase and the metallic phase are formed from these expensive precursor materials and the metal, an exchange reaction again being used to form these phases, in this case between the precursor material and the filling metal.

A further process likewise describes the infiltration of a ceramic sacrificial body with aluminum (U.S. Pat. No. 4,988,645). In this process, the ceramic body is produced using an SHS reaction (SHS reaction: self-propagating high-temperature synthesis, meaning the ignition of a reactive mixture with the reaction propagating itself and providing the desired ceramic matrix as reaction products).

However, some components produced in this way have unacceptable levels of porosity, and consequently the reject rate is high. In particular, the filling with sacrificial bodies containing $TiO_2$ as precursor material of the sacrificial body is very poor.

In general terms, all the above methods have a high energy requirement, which is attributable, inter alia, to the various thermal processes, such as sintering, first exchange reaction, filling and subsequent second exchange reaction at temperatures which are higher than the filling temperature. This energy requirement makes the processes expensive.

WO 84/02927 has disclosed a process for producing fiber-reinforced die-cast parts containing aluminum using the so-called squeeze-casting process. In the process, firstly a porous green body is pressed from a starting mix containing, inter alia, fibers, and this green body is then filled with aluminum. To stabilize the porous green body and to maintain the orientation of the fibers arranged in the green body, a binder is added to the starting mix and is removed by thermal means during filling of the green body. Due to the presence of the pores and the strength of the binder, the green body does not undergo any deformation, or at most only negligible deformation. In this case, there is no chemical reaction between the filling aluminum and the starting materials of the green body, and consequently the influence of such a reaction on the structure and form of the subsequent die-cast component is not known.

SUMMARY OF THE INVENTION

The object of the invention is to further develop the known process in such a way that the production of components from a metal/ceramic composite material is simpler, quicker and, in particular, less expensive and more energy-efficient, and in such a way that the volume of the composite body can be provided with titanium aluminide reliably and to the greatest possible extent.

With the sacrificial body on which the invention is based, this object is achieved by:

1. adding carbon and/or its precursors (hereafter referred to as a "carbon source"), fillers and binders to the starting mix, wherein the binder joins the individual constituents of the starting mix to one another, at least in certain areas, in a pressure-stabilizing manner;
2. selecting the conversion temperature to be less than or equal to the filling temperature;
3. selecting a filler and preferably also a binder with a decomposition temperature which is less than or equal to the filling temperature;
4. directly filling the pressure-stabilized sacrificial body with aluminum;
5. removing the filler and, if appropriate, the binder, preferably by thermal means, before or during the filling with aluminum;
6. wherein the filling temperature is above the melting temperature of the aluminum but below a reaction temperature at which an exchange reaction takes place between the aluminum and the oxide of titanium;
7. after the sacrificial body has been filled with the aluminum, cooling the filled sacrificial body to a transformation temperature which is below the melting temperature of the aluminum, and;
8. reacting the starting materials of the sacrificial body and the aluminum with one another in a solid-state reaction at the transformation temperature to form the $Al_2O_3$/titanium aluminide composite material.

By using a pressure-stable sacrificial body which preferably contains reduced titanium oxide $TiO_x$, where x =1, 1.5, 1.67 or, in particular, $TiO_2$ which can be reduced by carbon, and which is preferably formed and/or machined close to its final form, it is even possible for the molten Al to be infiltrated spontaneously and therefore in particular to be very well pressure-infiltrated.

The reaction between the aluminum and the materials of the sacrificial body to form an $Al_2O_3$/titanium aluminide composite material from the starting materials may in particular be performed in a single heating operation.

The transformation temperature is preferably below the filling temperature, preferably below the melting temperature of the aluminum, and particularly preferably below 400° C. In this way, the energy consumption required, and also the production time required is reduced.

To fill the sacrificial body with aluminum or with an aluminum alloy, the sacrificial body is heated. It is therefore appropriate, in order to produce the sacrificial body, to use inter alia $TiO_2$ and C, since under certain circumstances the reduced titanium oxide $TiO_x$ (TiO, $Ti_2O_3$ and/or $Ti_3O_5$) inter alia may be formed from $TiO_2$ and C when heated.

Surprisingly, however, during the pressure infiltration of the sacrificial body with aluminum, there is as yet no exchange reaction forming $Al_2O_3$/titanium aluminide composite material. As mentioned above, the formation of the $Al_2O_3$/titanium aluminide composite material only takes place through a solid-state reaction, the process temperature of which is below the melting temperature of the aluminum.

DESCRIPTION OF THE PREFERRED EMBODIMENTS

In further suitable embodiments of the invention:

for filling, the aluminum and the mould and/or the sacrificial body are heated to the filling temperature;

the sacrificial body is filled with the aluminum in the unsintered state;

the sacrificial body is produced close to its final shape;

the sacrificial body is machined to close to its final shape;

the oxide of titanium is a member selected from the group consisting of TiO, $Ti_2O_3$, $Ti_3O_5$, and $TiO_2$, preferably $TiO_2$;

the $TiO_2$ is reduced by the carbon, the filler and/or the binder is removed thermally, and during the thermal removal of the filler and/or the binder, the carbon is formed as an end product and remains in the sacrificial body;

the filler is vaporized below the filling temperature and/or is converted into carbon;

the binder is vaporized below the filling temperature and/or is converted into carbon;

the filler is an organic material, preferably thermoplastic or thermosetting material, and particularly preferably starch and/or flour and/or a cellulose derivative, in particular cellulose acetate;

the ingredients of the starting mix are homogeneously dispersed;

1–3% by weight of binder is added to the starting mix;

the filler is a powder with a preferred grain size of between 10 $\mu$m and 100 $\mu$m, preferably approximately 20 $\mu$m;

the binder is polyvinyl alcohol and/or polyethylene glycol, preferably in an aqueous solution;

nonvolatile additives, in particular TiC and/or SiC and/or BaC and/or $TiB_2$, are added to the starting mix at the filling temperature;

the $Al_2O_3$ of the ceramic phase is bonded together in all three spatial directions;

fibers, in particular of mineral and/or ceramic materials are added to the starting mix;

the aluminum is introduced with only a slight excess pressure;

the process of the invention is used for producing frictional surfaces of tribological systems and/or engine components and/or vehicle components and/or brake discs and/or frictional surfaces for brake discs.

Otherwise, the invention is explained in more detail with reference to a number of examples described below.

A pulverulent ceramic starting mix containing carbon and $TiO_2$ and a binder and a filler is mixed and then pressed.

By means of a low-temperature heat treatment in vacuo or under protective gas, a porous, unsintered, pressure-stable ceramic sacrificial body is formed. The preferred protective gas is nitrogen or $CO_2$. The process is carried out between 350° C. and 700° C., preferably at 400° C. The filler and, if appropriate, the binder, is burnt off in vacuo or under protective gas.

Expediently, thermogravimetric analysis (TG) is carried out at the same time, serving to prove that the binder and, if appropriate, the filler has/have been completely removed.

The controlled addition of the fillers and the binder makes it possible to establish an accurately defined porosity, pore structure and strength, thus allowing pressure infiltration of the sacrificial body with aluminum.

One of the advantages of the invention is that throughout the entire production of a component from a metal/ceramic composite material of this nature, i.e. starting from the production of the sacrificial body, through the filling of the sacrificial body with aluminum, to the formation of the composite material by the exchange reaction, there is no need for temperature steps carried out at over 800° C., in particular over 700° C. On the other hand, production takes place within a short time, in particular the filling by pressure casting.

Furthermore, the aluminum is converted into a high-temperature-resistant titanium aluminide. In addition, very favorable raw materials are used; the material price is currently approximately 4 DM per kg.

To produce the starting mix, firstly in particular titanium dioxide and graphite are mixed in a defined stoichiometric ratio with respect to one another. Then, 1–3% by weight of binder, preferably polyvinyl alcohol (PVA) and/or polyethylene glycol (PEG), in an aqueous solution is added to the homogeneous mix, followed by kneading. After the binder, a water-soluble organic filler in powder or fiber form, preferably a cellulose derivative, in particular cellulose acetate, is added to the mixture, likewise followed by kneading.

The filler, which is preferably added in powder form, in particular has a mean grain size of between 10 $\mu$m and 100 $\mu$m preferably of 20 $\mu$m. The mixture is either dried or left in the moist state (residual moisture approx. 10–20% $H_2O$), and uniaxially pressed, in particular at 300 bar. The uniaxial pressing operation is optionally followed by a further cold isostatic pressing operation.

The sacrificial body, which has preferably been pressed close to its final shape, is machined to its final dimensions and is placed in a die-casting die for subsequent filling of the sacrificial body with liquid aluminum during the further production of the component.

The strength, the modulus of elasticity, the porosity and the pore structure of the sacrificial body are of importance for filling with aluminum in the die-casting process.

These properties can be influenced by the selection of binder, of fillers, of the quantity of fillers and the pressing pressure. Furthermore, the particle sizes of the ceramic powder ($TiO_2$ etc.) and of the fillers also play a role.

The relationships between the influencing parameters and target parameters are shown qualitatively in Table 1 below.

| Target Parameters ↓ | Type of Filler | Filler Quantity | Pressing Pressure | Particle Size |
|---|---|---|---|---|
| Green Strength | + | + | +++ | + |
| Modulus of Elasticity | + | + | +++ | + |
| Porosity | + | ++ | ++ | ++ |
| Pore Structure | ++ | ++ | + | +++ |

Influencing parameters →

+ = slight influence; ++ = average influence; +++ = great influence

EXAMPLES

A number of examples of starting mixes for sacrificial bodies are given below in Examples 1 to 7.

Example 1

3 mol $TiO_2$ (mean grain diameter $d_{50}$=0.3 $\mu$m) undergo preliminary mixing with one mole C ($d_{50}$=0.05 $\mu$m) for approx. 10 min in a kneader (e.g. produced by Eirich). 3% by weight of polyethylene glycol (in 20% aqueous solution) is added to this mixture, followed by kneading. Then, 10% by weight of cellulose acetate (CA) ($d_{50}$=20 $\mu$m) is added to the moist mix, followed by mixing in the kneader. The powder is uniaxially pressed at 30 MPa. This is followed by cold isostatic pressing at a pressure of 200 MPa. The sacrificial body is heated for 1 hour at 700° C. under nitrogen (holding time at 350° C., heating rate 1 K/min), during which time all the organic additives burn off without leaving a residue. The sacrificial body has a compressive strength of 7 MPa and a porosity of 49%. The pore diameters have a bimodal distribution, with one maximum at 0.1 $\mu$m and one maximum at 20 $\mu$m.

Example 2

Same as Example 1, except that the molar ratio between $TiO_2$ and C is 3/2. In this case, isostatic further pressing at 300 MPa is required.

Example 3

Same as Example 1, except that the amount of cellulose acetate is 20% by weight.

Example 4

Same as Example 1, except that 10% by weight of water is added to the mix of $TiO_2$/C/PEG/CA before the uniaxial pressing.

Example 5

Same as Example 1, except that 1% by weight of methylcellulose is added to the mix of $TiO_2$/C/PEG/CA before the uniaxial pressing.

Example 6

Same as Example 1, except that short constantan wire fibers or C fibers are added to the mix of $TiO_2$/C/PEG/CA. This increases the elongation at break.

Example 7

Same as Example 1, except that the grain size of the $TiO_2$ has a mean diameter of 15 $\mu$m. This reduces the porosity to 47%. The compressive strength increases to 7.5 MPa.

The sacrificial bodies are provided for subsequent pressurized filling with aluminum. After filling, they are subjected to a heat treatment at below the melting point of the aluminum, resulting in a component comprising composite material which contains in particular homogeneously distributed TiC, $Al_2O_3$, and $Al_3Ti$.

It should be pointed out here in particular that a solid-state reaction takes place during the subsequent heat treatment to produce the composite material. Therefore, this reaction can take place at below the melting point of the aluminum. The preferably homogeneous composite material is high-temperature-resistant and wear-resistant.

The process according to the invention and therefore also the starting mix according to the invention or the sacrificial body according to the invention are suitable in particular for the production of frictional surfaces of tribological systems or of engine components and/or of vehicle components and/or of brake discs and/or of frictional surfaces for brake discs. Tribological systems are to be understood as meaning, in addition to brake discs, also structural components in jet engines and motors, in particular sliding-contact bearings and cutting materials.

What is claimed is:

1. A process for producing a component from an $Al_2O_3$/titanium aluminide composite material comprising pressing a shaped body from a starting mix containing an oxide of titanium, a source of carbon, at least one filler, and at least one binder; subjecting the shaped body to a heat treatment at a conversion temperature to produce a sacrificial body; filling the sacrificial body with softened or liquid aluminum under pressure at a filling temperature; and reacting the sacrificial body with the filled aluminum to form an $Al_2O_3$/titanium aluminide composite material, wherein the conversion temperature is selected to be less than or equal to the filling temperature, wherein the filler has a decomposition temperature which is less than or equal to the filling temperature, wherein the filler is removed before or during the filling with aluminum; and wherein the filling temperature is above the melting temperature of the aluminum but below a reaction temperature at which an exchange reaction takes place between the aluminum and the oxide of titanium.

2. A process according to claim 1, wherein, for filling, the aluminum and the mould are heated to the filling temperature.

3. A process according to claim 2, wherein, for filling, the sacrificial body is heated to the filling temperature.

4. A process according to claim 1, wherein the sacrificial body is filled with the aluminum in the unsintered state.

5. A process according to claim 1, wherein the sacrificial body is produced close to its final shape.

6. A process according to claim 1, wherein the sacrificial body is machined to close to its final shape.

7. A process according to claim 1, wherein said oxide of titanium is a member selected from the group consisting of TiO, $Ti_2O_3$, $Ti_3O_5$, and $TiO_2$.

8. A process according to claim 7, wherein said oxide of titanium is $TiO_2$.

9. A process according to claim 8, wherein the $TiO_2$ is reduced by the carbon, the filler is removed thermally, and during the thermal removal of the filler, the carbon is formed as an end product and remains in the sacrificial body.

10. A process according to claim 1, wherein the filler is vaporized below the filling temperature or is converted into carbon.

11. A process according to claim 1, wherein the binder is vaporized below the filling temperature or is converted into carbon.

12. A process according to claim 1, wherein the filler is an organic filler.

13. A process according to claim 12, wherein the filler is a thermoplastic or thermosetting material.

14. A process according to claim 13, wherein the filler is selected from the group consisting of starch, flour, and cellulose derivatives.

15. A process according to claim 14, wherein the filler is cellulose acetate.

16. A process according to claim 1, wherein the ingredients of the starting mix are homogeneously dispersed.

17. A process according to claim 1, wherein 1–3% by weight of binder is added to the starting mix.

18. A process according to claim 1, wherein the filler is a powder with a grain size of between 10 $\mu$m and 100 $\mu$m.

19. A process according to claim 18, wherein the filler has a grain size of about 20 $\mu$m.

20. A process according to claim 1, wherein the binder is polyvinyl alcohol or polyethylene glycol.

21. A process according to claim 20, wherein the binder is in an aqueous solution.

22. A process according to claim 1, wherein a nonvolatile additive is added to the starting mix at the filling temperature.

23. A process according to claim 22, wherein the nonvolatile additive is selected from the group consisting of TiC, SiC, BaC, $TiB_2$, and mixtures thereof.

24. A process according to claim 1, wherein the $Al_2O_3$ of the $Al_2O_3$/titanium aluminide composite material is bonded together in all three spatial directions.

25. A process according to claim 1, wherein mineral or ceramic fibers are added to the starting mix.

26. A process according to claim 1, wherein the aluminum is introduced with only a slight excess pressure.

27. A process according to claim 1, wherein after the sacrificial body has been filled with the aluminum, the filled sacrificial body is cooled to a transformation temperature which is below the melting temperature of the aluminum, and wherein at the transformation temperature starting materials of the sacrificial body and the aluminum are reacted with one another in a solid-state reaction to form the $Al_2O_3$/titanium aluminide composite material.

28. A process according to claim 1, wherein the binder has a decomposition temperature which is less than or equal to the filling temperature.

29. A process according to claim 1, wherein the binder is removed before or during the filling with aluminum.

30. A process according to claim 1, wherein the component is a tribological system having a frictional surface.

31. A process according to claim 1, wherein the component is an engine component having a frictional surface.

32. A process according to claim 1, wherein the component is a vehicle component having a frictional surface.

33. A process according to claim 1, wherein the component is a brake disc having a frictional surface.

34. A product made by the process of claim 1.

35. A tribological system having a frictional surface made by the process of claim 1.

36. An engine component having a frictional surface made by the process of claim 1.

37. A vehicle component having a frictional surface made by the process of claim 1.

38. A brake disc having a frictional surface made by the process of claim 1.

* * * * *